United States Patent [19]

Ohishi et al.

[11] Patent Number: 5,159,820
[45] Date of Patent: Nov. 3, 1992

[54] OIL SEPARATOR INTEGRALLY MOUNTED ON COMPRESSOR

[75] Inventors: Shigeji Ohishi, Kariya; Shin Honda, Nagoya; Hisayoshi Sakakibara, Nishio; Kenichi Fujiwara, Kariya, all of Japan

[73] Assignee: Nippondenso Co., Ltd., Kariya, Japan

[21] Appl. No.: 548,703

[22] Filed: Jul. 5, 1990

[30] Foreign Application Priority Data

Jul. 5, 1989 [JP] Japan .................. 1-173562
May 9, 1990 [JP] Japan .................. 2-117508

[51] Int. Cl.⁵ ........................................ F25B 43/02
[52] U.S. Cl. ........................................ 62/468; 62/84; 62/470; 210/168
[58] Field of Search ................. 62/84, 468, 470; 210/168

[56] References Cited

U.S. PATENT DOCUMENTS

| | | | |
|---|---|---|---|
| 3,408,826 | 11/1968 | Soumerai et al. | 62/470 X |
| 4,472,949 | 9/1984 | Fujisawa et al. | |
| 4,478,050 | 10/1984 | DiCarlo et al. | |
| 4,530,215 | 7/1985 | Kramer | 62/84 |
| 4,662,190 | 5/1987 | Tischer | |
| 4,876,859 | 10/1989 | Kitamoto | 62/117 |
| 5,001,908 | 3/1991 | Mayer | 62/84 X |

FOREIGN PATENT DOCUMENTS

| | | |
|---|---|---|
| 0264735 | 4/1988 | European Pat. Off. |
| 55-102913 | 7/1980 | Japan . |
| 55-104785 | 7/1980 | Japan . |
| 56-88071 | 7/1981 | Japan . |
| 58-168864 | 10/1983 | Japan . |
| 60-143812 | 7/1985 | Japan . |
| 61-155691 | 7/1986 | Japan . |
| 62-199992 | 9/1987 | Japan . |
| 64-01721 | 1/1989 | Japan . |
| 2036606 | 7/1980 | United Kingdom . |
| 8807654 | 10/1988 | World Int. Prop. O. ............ 62/470 |

*Primary Examiner*—Henry A. Bennet
*Assistant Examiner*—Christopher B. Kilmer
*Attorney, Agent, or Firm*—Cushman, Darby & Cushman

[57] ABSTRACT

An oil separator used in a refrigerating system. The oil separator comprises a body for forming a centrifugal oil separating chamber and an oil storage chamber, with a separating plate dividing the chambers. An inlet passage is connected tangentially to the oil separating chamber, to cause a swirl in the chamber, and a medium outlet passage extends inwardly from an end wall into the oil separating chamber. An oil outlet passage(s) is provided in the separating plate at a position near a periphery thereof. The oil separator body is formed integrally with the compressor housing and a ring member is fitted in an inner surface of the oil storage chamber, and a helically shaped narrow groove is provided on the outer surface thereof to form an oil returning passage. Also, the oil outlet passage can be provided in the separating plate at a position lower than a highest level of the oil storage chamber, thereby allowing the chambers to be arranged in a horizontal side by side relationship.

29 Claims, 7 Drawing Sheets

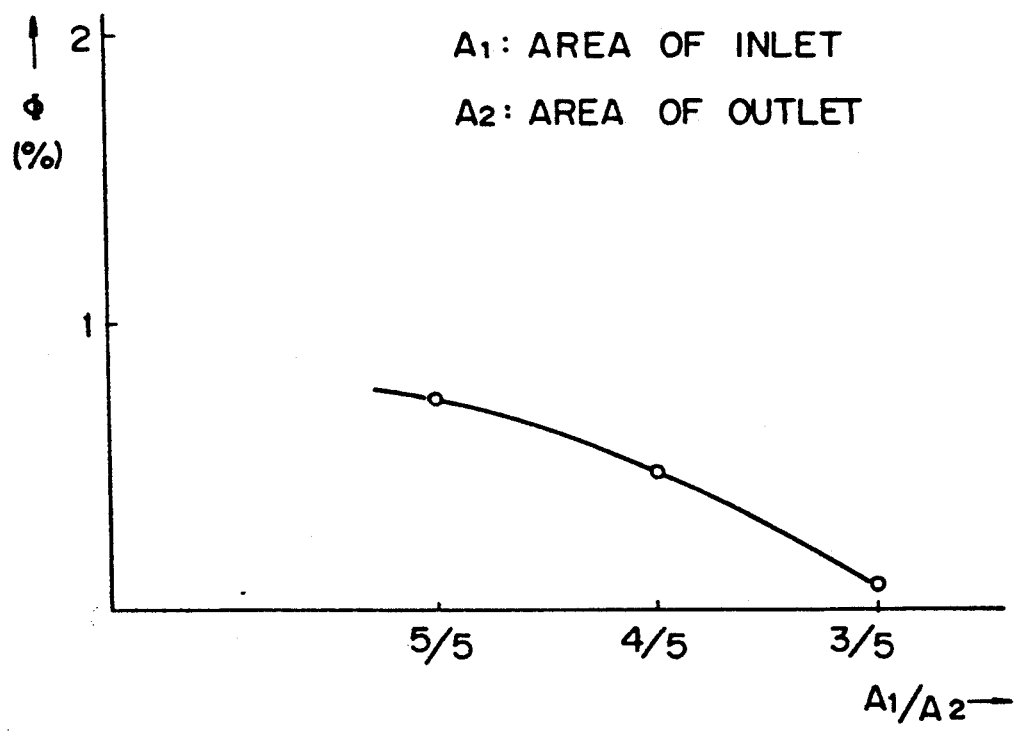

OIL SEPARATOR INTEGRALLY MOUNTED ON COMPRESSOR

BACKGROUND OF THE INVENTION

1. Field of the Invention

The present invention relates to an oil separator for separating lubricating oil from a gaseous refrigerating medium used in a refrigerating system such as air conditioner for an automobile.

2. Description of the Related Arts

In a refrigerating cycle, a refrigerating medium is compressed in a compressor, delivered to a condenser to be condensed and cooled therein, fed to an evaporator via an expansion valve for a heat exchange, and then returned from the evaporator to the compressor.

In such a conventional refrigerating cycle, lubricating oil is mixed in the refrigerating medium for lubricating the compressor, and thus the refrigerating medium output from the compressor contains lubricating oil therein. This lubricating oil contained in refrigerating medium, however, has far different condensation and evaporation properties from those of the refrigerating medium, and if such a lubricating oil is fed to the condenser and the evaporator, the heat exchange performance, and thus the performance of the refrigerating cycle, is lowered.

Accordingly, conventionally an oil separator is arranged between the outlet of the compressor and the inlet of the condenser, for separating the lubricating oil from refrigerating medium output from the compressor and returning the separated lubricating oil to the suction side of the compressor.

Typical of these centrifugal type oil separators are those proposed and disclosed in, for example, Japanese Unexamined Utility Model (Kokai) No. 55-102913, No. 55-104785, No. 56-88071, and 64-1721.

Currently, a variable capacity type compressor is widely utilized in an air conditioner for an automobile, and a new refrigerating medium is used due to the restrictions on the use of flon. Accordingly, the return of the lubricating oil to the compressor has become less satisfactory, and thus the demand for an efficient oil separator has increased.

Nevertheless, a conventional oil separator, such as that described in the above cited references, comprises a unit separated from the other unit, i.e., the compressor, and thus a problem arises in that the structure of the refrigerating system has become more complicated.

SUMMARY OF THE INVENTION

The object of the present invention is to solve the above problem and to provide an oil separator which does not necessitate a complicated arrangement of a refrigerating system and reduces a flow of lubricating oil from the compressor to the refrigerating system.

Another object of the present invention is to provide an oil separator in which, even when an oil separating chamber is inclined or may be occasionally inclined relative to the vertical and a flow direction of the lubricating oil due to the force of gravity does not coincide with an axis of the inclined oil separating chamber along which lubricating oil swirls, it is still possible to extract the separated oil from the oil separating chamber and feed it to an oil storage chamber.

A further object of the present invention is to provide an oil separator which comprises an oil storage chamber having a large capacity but does not substantially increase the size of the oil separator.

A still further object of the present invention is to provide an oil separator which comprises an oil storage chamber which can be freely arranged in a refrigerating system.

Yet another object of the present invention is to provide an oil separator which eliminates a restriction that an oil separating chamber must be located at an upper position and an oil storage chamber must be located at a lower position, and thus can be freely arranged to thereby obtain a compact oil separator.

In one aspect of the present invention, there is provided an oil separator used in a refrigerating system comprising an arrangement in series of a compressor, a condenser, an expanding means, and an evaporator; the compressor outputting a mixed fluid composed of a refrigerating medium and a lubricating oil, the oil separator receiving the mixed fluid, separating the lubricating oil from the mixed fluid, and returning the lubricating oil to the compressor. This oil separator comprises a first circumferential wall means for forming a cylindrical bore therein to thereby form an oil separating chamber, the oil separating chamber having an axis; first and second axially spaced end walls closing the cylindrical bore; means for forming an inlet passage in the first circumferential wall means such that the inlet passage is connected tangentially to the cylindrical bore at a position near the first end wall; means for forming a medium outlet passage therein to extend coaxially with the axis from the first end wall into the cylindrical bore, the medium outlet passage having an inner opening facing the second end wall; means for forming at least one oil outlet passage at the second end wall, at a position near a periphery of the second end wall; and second circumferential wall means for forming an oil storage chamber therein for storing oil separated in the oil separating chamber and fed through the oil outlet passage; wherein the compressor comprises a compressor housing, and the first circumferential wall means and the second circumferential wall are formed integrally with the compressor housing.

With this arrangement, the oil separator is formed integrally with the compressor, i.e., the oil separator is incorporated in the compressor, and therefore, it is possible to simplify the arrangement of the refrigerating system, and thus facilitate the assembly of the refrigerating system. Also, it is possible to separate oil just after the discharge of the mixed fluid from the compressor, and thus shorten the length of the piping required. The medium outlet passage extends coaxially into the oil separating chamber, and therefore, a strong swirl of the mixed fluid is generated in a relatively narrow cylindrical space between the inner surface of the oil separating chamber and the outer surface of the inwardly projecting medium outlet passage, to thereby centrifugally separate the liquid oil, and the swirl is maintained close to the inner opening of the medium outlet passage so that the refrigerating medium can flow out through the medium outlet passage while the lubricating oil is adhered to the inner surface of the oil separating chamber.

In another aspect of the present invention, the oil separator comprises first circumferential wall means for forming a cylindrical bore therein, to thereby form an oil separating chamber, the oil separating chamber having an axis; first and second axially spaced end walls closing the cylindrical bore; means for forming an inlet passage in the first circumferential wall means such that the inlet passage is connected tangentially to the cylindrical bore at a position near the first end wall; means for forming a medium outlet passage therein to extend coaxially with the axis from the first end wall into the cylindrical bore, the medium outlet passage having an inner opening facing the second end wall; means for forming at least one oil outlet passage at the second end wall, at a position near a periphery of the second end wall; second circumferential wall means for forming an oil storage chamber therein for storing oil separated in the oil separating chamber and fed through the oil outlet passage; and a ring member fitted in an inner surface of the second circumferential wall means constituting the oil storage chamber, a means being provided for forming an oil returning passage between the ring member and the second circumferential wall means, the oil returning passage having one end in communication with the oil storage chamber and the other end connectable to a lower pressure portion of the compressor; wherein the compressor comprises a compressor housing, and the first circumferential wall means and the second circumferential wall means are formed integrally with the compressor housing.

With this arrangement, the ring member provides a capillary-like oil returning passage through which lubricating oil is returned to the intake side of the compressor. This provides a compact pressure reduction mechanism which absorbs a pressure difference between the higher pressure side and the lower pressure side of the compressor, and thus it is possible to avoid one of the reasons for increasing the size of the compressor.

In a further aspect of the present invention, the oil separator comprises first circumferential wall means for forming a cylindrical bore therein, thereby forming an oil separating chamber, the oil separating chamber having an axis; first and second axially spaced end walls closing the cylindrical bore; means for forming an inlet passage in the first circumferential wall means such that the inlet passage is connected tangentially to the cylindrical bore at a position near the first end wall; means for forming a medium outlet passage therein to extend coaxially with the axis from the first end wall into the cylindrical bore, the medium outlet passage having an inner opening facing the second end wall; means for forming at least one oil outlet passage at the second end wall at a position near a periphery of the second end wall; second circumferential wall means for forming an oil storage chamber therein for storing oil separated in the oil separating chamber and fed through the oil outlet passage, the oil storage chamber being formed directly on the other side of the second end wall; and means for forming an oil returning passage for returning lubricating oil from the oil storage chamber to an intake side of the compressor; wherein the oil outlet passage is provided in the second end wall at a position lower than a highest level of the oil storage chamber so that lubricating oil is introduced from the oil separating chamber into the oil storage chamber under a pressure differential between the oil separating chamber and the oil storage chamber, and the compressor comprises a compressor housing, the first circumferential wall means and the second circumferential wall means being formed integrally with the compressor housing.

With this arrangement, the oil outlet passage is provided in the second end wall at a position lower than a highest level of the oil storage chamber, so that lubricating oil is introduced from the oil separating chamber into the highest level of the oil storage chamber under a pressure differential between the oil separating chamber and the oil storage chamber. Therefore, it is possible to arrange the oil separating chamber and the oil storage chamber horizontally in a side by side relationship, which removes the conventional restrictions on the layout of the oil separator and allows a compact oil separator to be obtained.

BRIEF DESCRIPTION OF THE DRAWINGS

The present invention will become more apparent from the following description of the preferred embodiments, with reference to the accompanying drawings, in which:

FIG. 16 is a view showing the relationship of the oil circulating rate $\Phi$ and the ratio of the area of inlet passage to the area of the medium outlet passage.

DESCRIPTION OF THE PREFERRED EMBODIMENTS

Figure 1A:
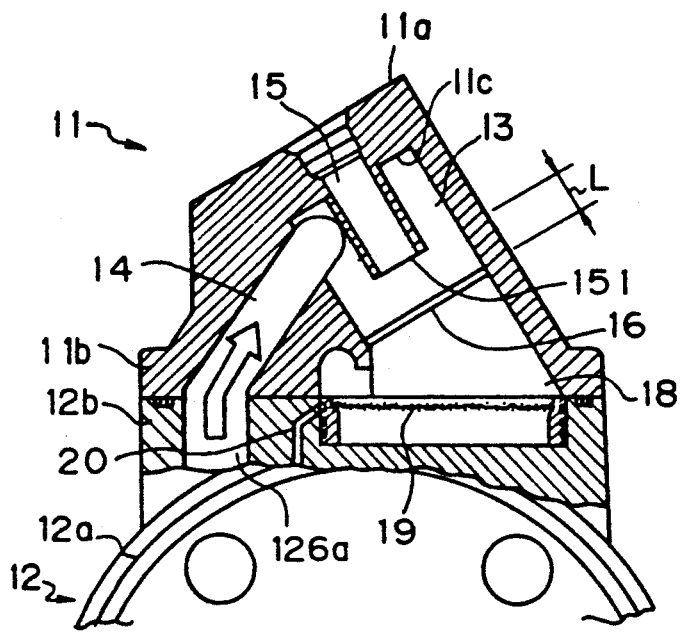
FIG. 1A is a cross-sectional view of an oil separator according to the first preferred embodiment of the present invention, together with a compressor.

FIG. 1A is a cross sectional view of an oil separator 11 formed integrally with a compressor 12. The compressor 12 has a compressor housing 12a having a horizontal axis and a flange 12b on the top of the compressor housing 12a. The oil separator 11 has a body 11a and a flange 11b on the bottom of the body 11a; the flange 11b of the oil separator 11 being coupled to the flange 12b of the compressor housing 12a.

The body 11a of the oil separator 11 comprises two parts, i.e., one part forming an oil separating chamber 13 for separating lubricating oil contained in the refrigerating medium, and the other part forming an oil storage chamber 18. The oil separating chamber 13 is formed in the shape of a cylindrical bore which is closed by an upper end wall 11c and a lower separating plate 16. An inlet passage 14 is formed in the body 11a and has one end connected to the oil separating chamber 13 and the other end connected to a discharge port 126a provided in the flange 12b of the compressor housing 12a. The compressor 12 pressurizes or compresses the refrigerating medium and discharges it from the discharge port 126a, and the refrigerating medium enters the oil separating chamber 13 via the inlet passage 14. Lubricating oil is contained in this refrigerating medium, for lubricating working elements of the compressor 12, and thus a mixed fluid of the refrigerating medium and a lubricating oil is discharged from the discharge port 126a.

Figure 1B:
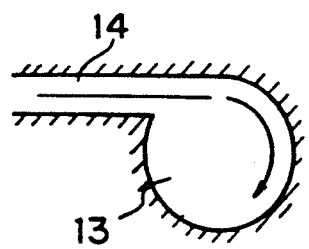
FIG. 1B is a schematic cross-sectional view of the oil separating chamber and the inlet passage of the oil separator in FIG. 1A.

The inlet passage 14 opens in the upper end region of the oil separating chamber 13, i.e., at a position near the upper end wall 11c, and is tangentially connected to the inner circumferential surface of the oil separating chamber 13 as shown in FIG. 1B. The mixed fluid flowing from the inlet passage 14 into the oil separating chamber 13 moves along the inner circumferential surface of the oil separating chamber 13, and thus swirls in the oil separating chamber 13.

A medium outlet passage 15 in the form of a tubular wall is attached to the upper end wall 11c at the center thereof, and extends coaxially with an axis of the oil separating chamber 13 from the upper end wall 11c into the oil separating chamber 13. The medium outlet passage 15 has an inner opening 151 facing the separating plate 16 and an outer opening to which a pipe (not shown) can be connected to feed the refrigerating medium from the oil separator 11 to a condenser of the refrigerating system.

Figure 2:
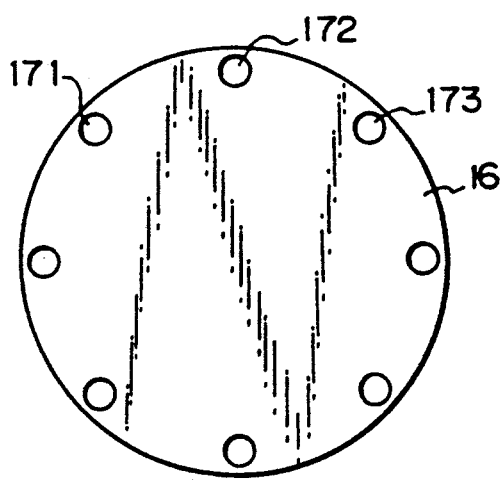
FIG. 2 is a plan view of the separating plate of the oil separator in FIG. 1A.

The separating plate 16 is located transversely of the oil separating chamber 13 at a distance L from the inner opening 151 of the medium outlet passage 15, to thereby constitute a bottom wall of the oil separating chamber 13. The separating plate 16 is formed by a disk of metal or plastic and has a plurality of small oil outlet passages (holes) 171, 172, 173, and so on located near a periphery of the separating plate 16, as shown in FIG. 2. The oil storage chamber 18 is formed directly on the other side of the separating plate 16 from the oil separating chamber 13, in a superposed relationship below the oil separating chamber 13. A lower portion of the oil storage chamber 18 is formed in the flange 12b of the compressor housing 12a, including the bottom wall thereof, and a filter 19 is arranged in the oil storage chamber 18 and lubricating oil passing through the filter 19 is returned to the intake side of the compressor 12 via a narrow oil return passage 20.

Figure 3:
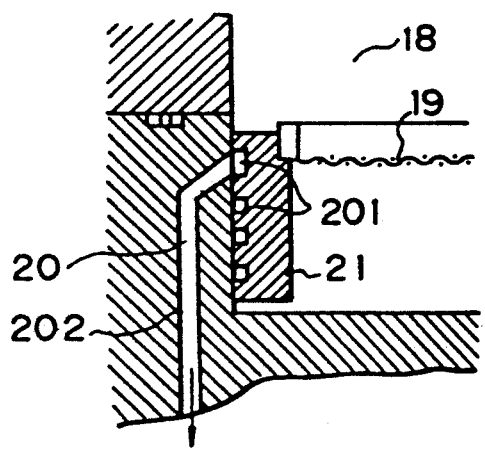
FIG. 3 is an enlarged view of a portion of the oil separator in FIG. 1A, illustrating the oil outlet passage.

FIG. 3 shows a portion of the narrow oil return passage 20 on an enlarged scale. A ring member 21 is fitted in the inner surface of the flange 12b forming the oil storage chamber 18, and the filter 19 is held on the top of the ring member 21. A helically shaped groove 201 is formed in the outer surface of the ring member 21; this outer opening side of the groove 201 being closed by the inner surface of the flange 12b forming the oil storage chamber 18. The bottom end of the groove 201 opens in the oil storage chamber 18 and the upper end of the groove 201 terminates near the top of the ring member 21 and meets a hole 202, provided in the flange 12b, through which the lubricating oil is returned to a lower pressure portion, i.e., the intake side of the compressor 12. Accordingly, the narrow oil return passage 20 comprises the groove 201 and the hole 202. Lubricating oil passing through the filter 19 enters the groove 201 at the bottom of the ring member 21 and is depressurized through the groove 201 before being returned to the compressor 12.

Accordingly, it is possible to fully absorb a pressure differential between the intake side and discharge side of the compressor 12, by providing the helically shaped groove 201 on the outer surface of the ring member 21 and using it as a restricted passage for decompression, and this restricted passage can be advantageously and compactly arranged.

The separating plate 16 separating the oil separating chamber 13 and the oil storage chamber 18 is arranged at a position away from the inner opening 151 of the medium outlet passage 15 such that the mixed fluid of lubricating oil and refrigerating medium flowing from the inlet passage 14 in the oil separating chamber 13 swirls along the inner surface of the oil separating chamber 13, and this swirl is maintained to cause the lubricating oil in the mixed fluid to be centrifugally urged against the inner surface of the oil separating chamber 13, even at a position near the separating plate 16 without being damped thereat, even if the oil separating chamber 13 is inclined to the vertical as shown in FIG. 1. Therefore, the liquid lubricating oil is forced axially toward the separating plate 16 and circumferentially toward the oil outlet passages 171, 172, and so on, while the gaseous refrigerating medium is output from the medium outlet passage 15.

Figure 4:
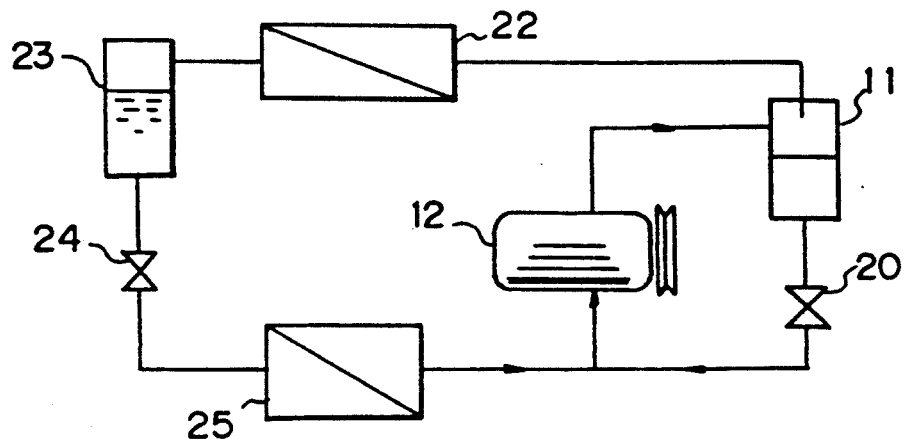
FIG. 4 is a schematic diagram of a refrigerating system used in the present invention.

FIG. 4 shows a refrigerating system using the oil separator 11. The refrigerating system includes an arrangement in series of the compressor 12, the oil separator 11, a condenser 22, a receiver tank 23, an expansion valve 24, and an evaporator 25. The mixed fluid of lubricating oil and refrigerating medium is discharged from the compressor 12 into the oil separator 11, and in the oil separator 11, the lubricating oil component is centrifugally separated from the refrigerating medium and adhered to the inner surface of the oil separating chamber 13 under the centrifugal force caused by the swirl in the oil separating chamber 13. This adhered lubricating oil is forced axially toward the separating plate 16 by the helically advancing swirl, and thus the lubricating oil passes through the oil outlet passages 171, 172, and so on under a pressure differential between the oil separating chamber 13 and the oil storage chamber 18, and is introduced into the oil storage chamber 18, and then is returned to the intake side of the compressor 12 through the filter 19 and the oil return passage 20.

The refrigerating medium passing through the medium outlet passage 15 of the oil separator 11 is condensed at the condenser 22, and the gaseous component of the condensed refrigerating medium is separated at the receiver tank 23. The liquid refrigerating medium is fed from the receiver tank 23 to the expansion valve 24 and converted into a cooled refrigerating medium based on expansion. This refrigerating medium exchanges heat and air at the evaporator 25, is converted to a gaseous refrigerating medium, and is returned to the intake side of the compressor 12.

In this centrifugal type oil separator 11 used in this refrigerating system, the separating plate 16 generally completely separates the oil separating chamber 13 and the oil storage chamber 18, so that the lubricating oil separated under the action of the swirl and introduced in the oil storage chamber 18 is not disturbed by the refrigerating medium flowing centrally in the oil separating chamber 13 toward the inner opening 151 of the medium outlet passage 15. Accordingly, the separating plate 16 also improves the oil separation performance.

Considering the oil separation performance, if the length of the oil separating chamber 13 is extended and the distance L between the inner opening 151 of the medium outlet passage 15 and the separating plate 16 is elongated, the distance travelled by the swirl becomes longer. The swirl is gradually damped as it advances toward the separating plate 16, and thus the centrifugal force thereof is weakened near the separating plate 16. Therefore, lubricating oil, once separated from the refrigerating medium and adhering to the inner wall of the oil separating chamber 13, may be peeled from the inner surface of the oil separating chamber 13 and again mixed with the centrally flowing refrigerating medium so that a portion of the lubricating oil is discharged from the medium outlet passage 15.

In the preferred embodiment of the present invention, the separating plate 16 constituting the bottom wall of the oil separating chamber 13 is arranged at a position such that the swirl generated by incoming mixture is not considerably damped at the separating plate 16. Accordingly, by arranging the separating plate 16 so that the swirl is not damped at the separating plate 16 located for from the inlet passage 14, it is possible to carry the lubricating oil to the peripheral oil outlet passages while the lubricating oil being is adhered to the inner surface of the oil separating chamber 13, and thus to obtain a higher oil separation performance.

Figure 5:
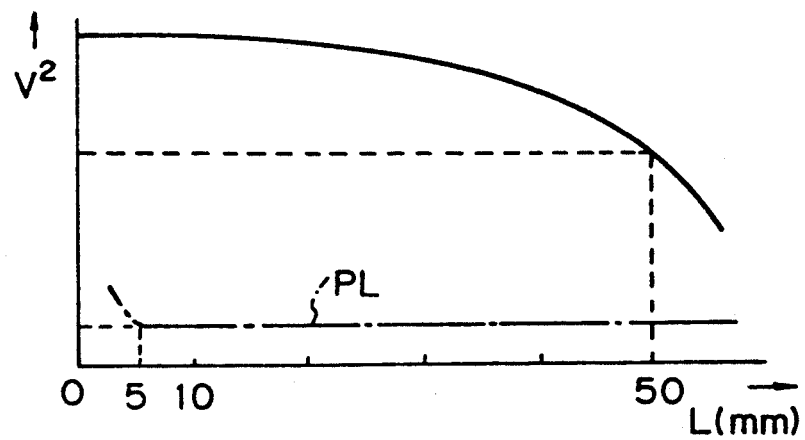
FIG. 5 is a view showing the relationship of the square of the velocity of the swirl and the distance L between the inner opening of the medium outlet passage and the separating plate.

FIG. 5 shows the relationship of the distance L between the inner opening 151 of the medium outlet passage 15 and the separating plate 16, and the square of the velocity V of the swirl in the separating chamber 13 (note, the centrifugal force is proportional to the square of the velocity V). It will be understood that the centrifugal force is slowly weakened with an increase of the distance L in the range from 0 to 50 millimeters, but is abruptly weakened beyond 50 millimeters.

Also in FIG. 5, a pressure loss PL between the inlet and outlet of the oil separator 11 is plotted by a semibroken line, relative to the distance L. It will be understood from this result that the pressure loss PL becomes large when the distance L is smaller than 5 millimeters. An increase in the pressure loss PL results in a reduction of refrigerating medium circulating in the refrigerating system, and thus a lowering of the performance of the refrigerating system, and therefore, preferably the distance L is more than 5 millimeters.

Figure 6:
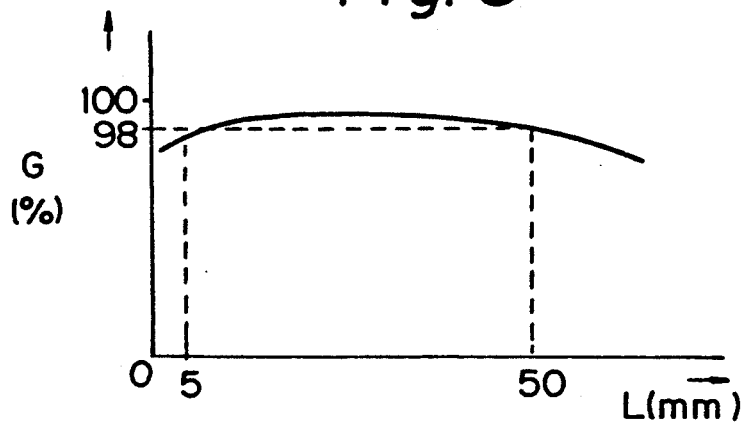
FIG. 6 is a view showing the relationship of the oil separating ability and the distance L between the inner opening of the medium outlet passage and the separating plate.

FIG. 6 shows the relationship of the distance L and the oil separating performance G. This oil separating performance G is a percentage of a value calculated from the relationship, G2/(G1+G2), where G1 is the amount of lubricating oil not separated at the oil separator 11 and flowing through the refrigerating system, G2 is the amount of lubricating oil separated at the oil separator 11, and (G1+G2) is the total intake value at the compressor 12. Preferably the oil separating performance G is held at at least 98 percent, to ensure a sufficient lubrication of the compressor 12 without a deterioration of the performance of the refrigerating system. In this regard, the distance L is less than 50 millimeters, as can be seen from FIG. 6. Preferably the distance L is from 5 millimeters to 50 millimeters, as can be seen from FIGS. 5 and 6.

In the above described preferred embodiment, the oil separator 11 is incorporated in the compressor 12, and thus the arrangement of the refrigerating system can be simplified and the assembly of refrigerating system facilitated. Also, it is possible to separate the lubricating oil just after the discharge of the mixed fluid from the compressor 12, and thus to use shorter piping.

In addition, the swirl is generated in a relatively narrow hollow cylindrical passage in the oil separating chamber 13 around the outer surface of the medium outlet passage 15 to separate lubricating oil, the separating plate 16 is arranged at a position such that the swirl is not damped, and the medium outlet passage 15 opens near the separating plate 16. Therefore, a strong swirl is maintained entirely in the oil separating chamber 13, to thereby adhere the lubricating oil against the inner surface of the oil separating chamber 13 and the gaseous refrigerating medium is output from the medium outlet passage 15.

Further, by arranging the medium outlet passage 15 so that the inner opening 151 thereof faces the separating plate 16 at a position near the separating plate 16, a reliable advance of the swirl in the oil separating chamber 13 from the inlet passage 14 toward the separating plate 16 is obtained, so that the separated oil is forced into the oil outlet passages 171, 172, and so on in the peripheral region of the separating plate 16 and the gaseous refrigerating medium flows into the medium outlet passage 15 at the inner end thereof along the reverse course relative to the swirl advance, and thus the lubricating oil is efficiently separated from the gaseous refrigerating medium.

It is possible to provide a sufficient oil separating performance even if the axis of the oil separating chamber 13 is inclined to the vertical, since a strong swirl is obtained as described above.

Figure 7:
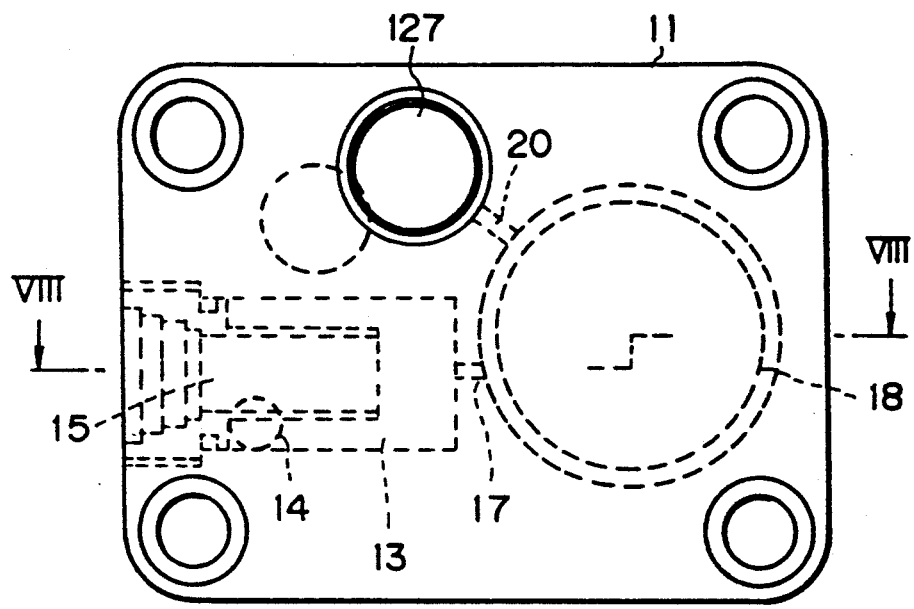
FIG. 7 is a plan view of an oil separator according to the second preferred embodiment of the present invention.
Figure 8:
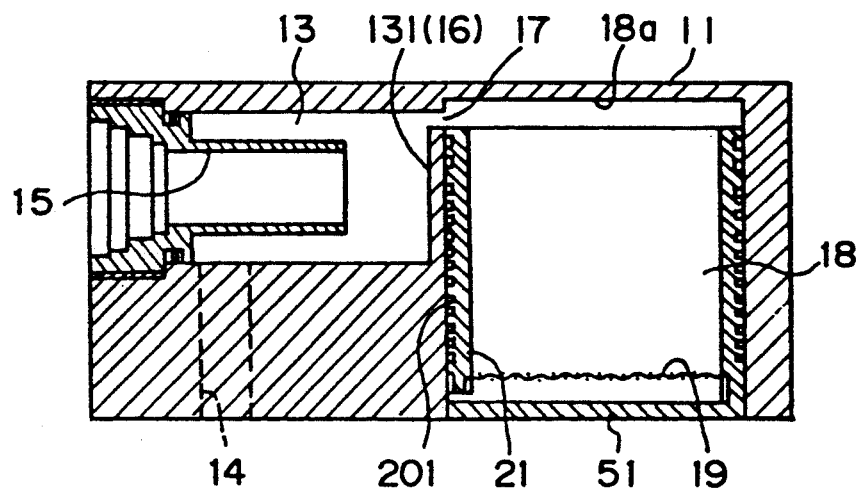
FIG. 8 is a cross-sectional view of the oil separator taken along the line VIII—VIII in FIG. 7.

FIGS. 7 and 8 show the second embodiment of the preferred embodiment of the present invention which can be incorporated in a compressor 12 and provides a more compact arrangement of the compressor 12, and thus an improved mountability thereof to an automobile.

In this embodiment, an oil separating chamber 13 is arranged so that it has a horizontal axis which may be directed in parallel to an axis of the compressor 12. An inlet passage 14 is provided vertically and is tangentially connected to the oil separating chamber 13. The compressor 12 discharges a mixed fluid to this inlet passage 14. A medium outlet passage 15 is provided at one end of the oil separating chamber 13 and extends into the oil separating chamber 13, and an oil storage chamber 18 is arranged such that it has a vertical axis and its upper wall is on the same level as the highest part of the oil separating chamber 13, with a vertical separating wall 131 dividing the oil separating chamber 13 and the oil storage chamber 18. The separating wall 131 is similar to the separating plate 16 in the previous embodiment and forms the bottom wall of the oil storage chamber 18.

In this embodiment, the separating wall 131 has only one oil outlet passage 17 at a position near the periphery thereof. The oil outlet passage 17 is at a highest level of the separating wall 131 but is lower than the highest level of the oil storage chamber 18, i.e., the inner surface 18a of the upper wall of the oil storage chamber 18. Lubricating oil is separated in the oil separating chamber 13 by the swirl, in the manner described above, and adhered to the inner surface of the oil separating chamber 13 under a centrifugal force sufficient to raise the lubricating oil to the oil outlet passage 17 at the highest level. The adhered lubricating oil is then introduced from the oil separating chamber 13 into the oil storage chamber 18 through the oil outlet passage 17, under a pressure differential between the oil separating chamber 13 and the oil storage chamber 18.

The medium outlet passage 15 is formed by a pipe or a tubular member having one end threadably engaged with a mating thread in the end wall of the oil separating chamber 13. A ring member 21 is also forcibly fitted in the oil storage chamber 18, and a filter 19 is held at the bottom of this ring member 21. The ring member 21 has a helically-shaped groove 201 formed in the outer surface thereof, to constitute a part of an oil return passage 20 as in the previous embodiment. A bottom plate 51 is fitted at the bottom of the oil storage chamber 18. Further, this oil separator 11 has an intake passage 127 formed therethrough, as shown in FIG. 7, which leads to an intake passage of the compressor 12.

Figure 9:
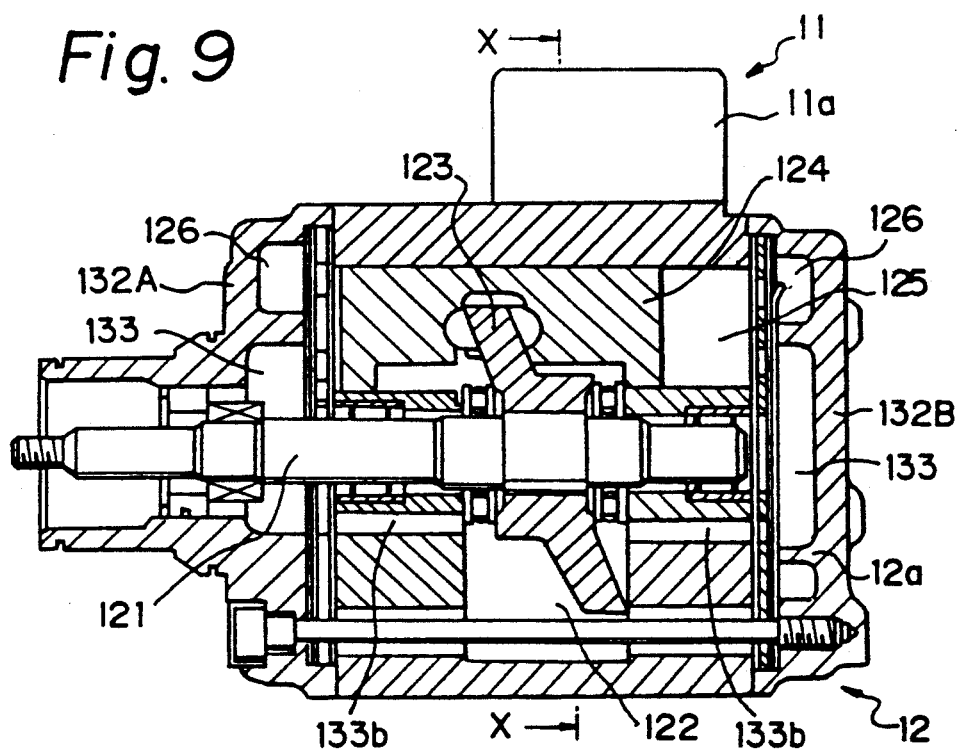
FIG. 9 is a cross-sectional view of the compressor, with the oil separator of FIGS. 7 and 8 integrally mounted thereon.
Figure 10:
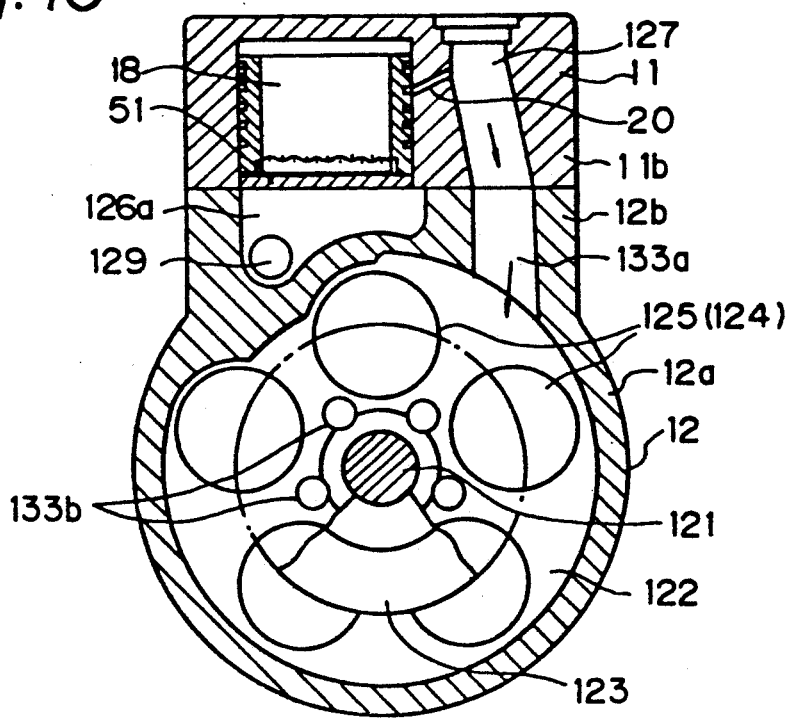
FIG. 10 is a cross-sectional view of the compressor and the oil separator taken along the line X—X in FIG. 9.

This oil separator 11 is attached to the compressor 12, as shown in FIGS. 9 and 10. The compressor 12 is an example of a swash plate type compressor.

The compressor 12 includes a compressor housing 12a having an upwardly projecting flange 12b to which a flange 11b of the oil separator 11 is coupled. The compressor 12 includes a rotatable shaft 121 driven by an engine (not shown) and a swash plate 123 fixed to the shaft 121 for rotation therewith and located in a swash plate chamber 122. The swash plate 123 has opposite surfaces which reciprocate when the swash plate 123 is rotated. A plurality of double head pistons 124 are connected to the swash plate 123, and in the preferred embodiment, five pistons 124 are slidably inserted in respective cylinders 125. Each of the pistons 124 reciprocates in the corresponding cylinder 125 to effect alternating compression and suction strokes when the swash plate 123 rotates.

The compressor 12 also includes valve plates 130 on either ends of the cylinders, a front housing 132A, and a rear housing 132B. Each of the valve plates 130 has known intake check valves and discharge check valves for respective cylinders 125, and each of the front and rear housings 132A and 132B has a central intake chamber 133 and a peripheral discharge chamber 126. A discharge port 129 is provided axially through the central compressor housing 12a and extends between the discharge chambers 126, and an upwardly opening discharge port or groove 126a is provided in the flange 12b, which is connected to the discharge port 129, and is covered by the oil separator 11 so that the inlet passage 14 of the oil separator 11 (FIG. 8) opens to this discharge port 126a. The compressor 12 also includes an intake passage 133a at the flange 12b thereof and connected to the intake passage 127 of the oil separator 11. The intake passage 133a extends internally of the compressor housing 12a and opens to the swash plate chamber 122 where the lubricating oil is needed. The swash plate chamber 122 is in turn connected to the intake chamber 133 via axially extending holes 133b. As shown in FIG. 10, the oil separator 11 includes an oil return passage 20 which extends from the oil storage chamber 18 to the intake passage 127, and thus the lubricating oil separated by the oil separator 11 is returned to the intake, or suction, side of the compressor 12.

Accordingly, a mixed fluid of lubrication oil and refrigerating medium is compressed in the cylinders 125 and introduced into the oil separating chamber 13 of the oil separator 11 via the discharge chamber 126, the discharge ports 129 and 126a, and the inlet passage 14. The lubricating oil is centrifugally separated from the refrigerating medium in the oil separating chamber 13, and the gaseous refrigerating medium is fed to the condenser via the medium outlet passage 15. The separated lubricating oil enters the oil storage chamber 18 via the oil outlet passage 17 and is then returned to the intake passages 127 and 133a via the filter 19 and the oil return passage 20. This returning lubricating oil is thus mixed with the gaseous refrigerating medium flowing from the evaporator and the mixed fluid is fed to the intake chamber 133 via the swash plate chamber 122 for the next compression.

In the oil separator 11 used in this way, even if the oil separating chamber 13 is arranged so that its axis is horizontal, a strong swirl in the oil separating chamber 13 enables the lubricating oil to be adhered to the inner surface of the oil separating chamber 13 against the force of gravity and then collected at the separating wall 131. Therefore, the oil separating performance will not be much reduced even if the axis of the oil separating chamber 13 is set at any orientation relative to the vertical, and accordingly, this oil separator 11 can function properly when used with the compressor for compressing a refrigerant medium in an air conditioner for an automobile. Although there is only one oil outlet passage 17 communicating the oil separating chamber 13 with the oil storage chamber 18 at the upper position, it is enough to introduce lubricating oil from the oil separating chamber 13 into the oil storage chamber 18, since a swirl can be generated in the oil separating chamber 13.

With this arrangement of the oil separator 11, since the oil outlet passage 17 is located below the highest level of the oil storage chamber 18 (the full level of lubricating oil in the oil storage chamber 18), it is easy to introduce lubricating oil from the oil separating chamber 13 into the oil storage chamber 18 under a pressure differential between the oil separating chamber 13 and the oil storage chamber 18, and thus to design the oil separator 11 while ignoring the conventional layout restriction. Particularly, in this embodiment, it is possible to minimize a height of a mechanical unit including the compressor 12 so that the unit can be easily equipped in a restricted engine room space of an automobile.

Figure 11:
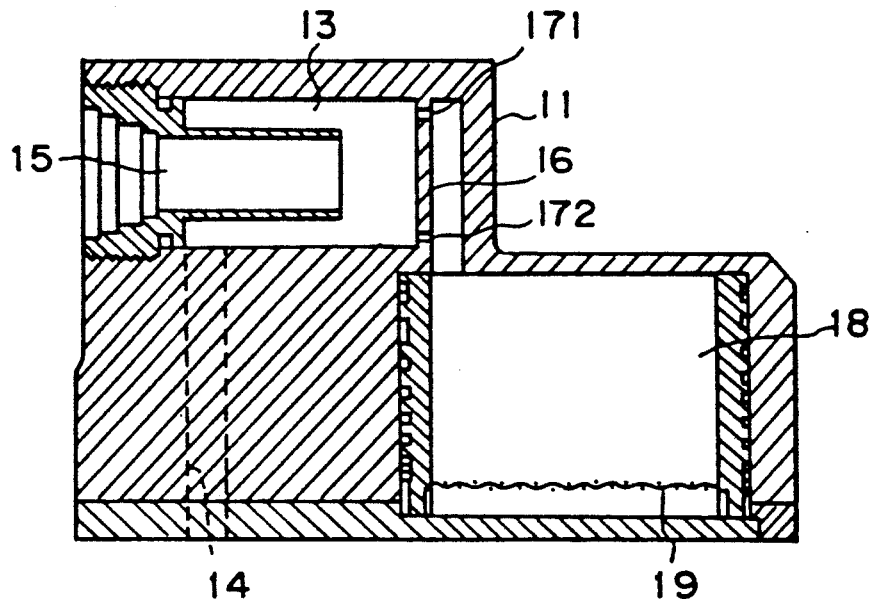
FIG. 11 is a cross-sectional view of an oil separator according to the third preferred embodiment of the present invention.

The second embodiment shows that the oil storage chamber 18 is located at the same height as the oil separating chamber 13, but in the third embodiment, as shown in FIG. 11, it is possible to arrange the oil storage chamber 18 at a lower position than the oil separating chamber 13. In this third embodiment, a plurality of oil outlet passages 171 and 172 are provided at positions near the periphery of the separating plate 16, in a manner similar to those of FIG. 2, but it may be sufficient to provide only one oil outlet passage at a lower position, to obtain the required function.

Figure 12:
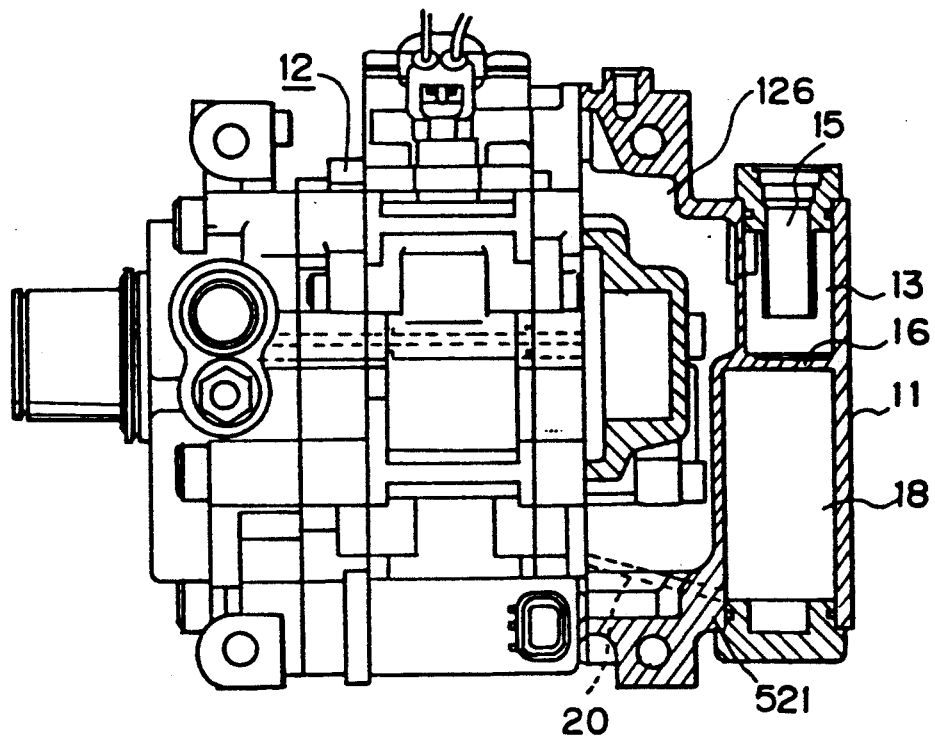
FIG. 12 is a cross-sectional view of an oil separator according to the fourth preferred embodiment of the present invention, wherein the oil separator is incorporated in the rear housing of the compressor.

FIG. 12 shows the fourth embodiment of the present invention in which an oil separator 11 is incorporated in a vane type compressor 12. The compressor 12 comprises a rear housing 521 coupled to a main housing including a rotor with movable vanes (not shown). A discharge chamber 126 is provided in the rear housing 521 and an oil separating chamber 13 and an oil storage chamber 18 of the oil separator 11 are integrally formed in this rear housing 521, with a separating wall 16 separating the oil separating chamber 13 and the oil storage chamber 18. Although the oil separating chamber 13 has an axis which is perpendicular to the axis of the compressor 12, it is still possible to design the compressor 12 in a compact form without increasing the height thereof.

Figure 13:
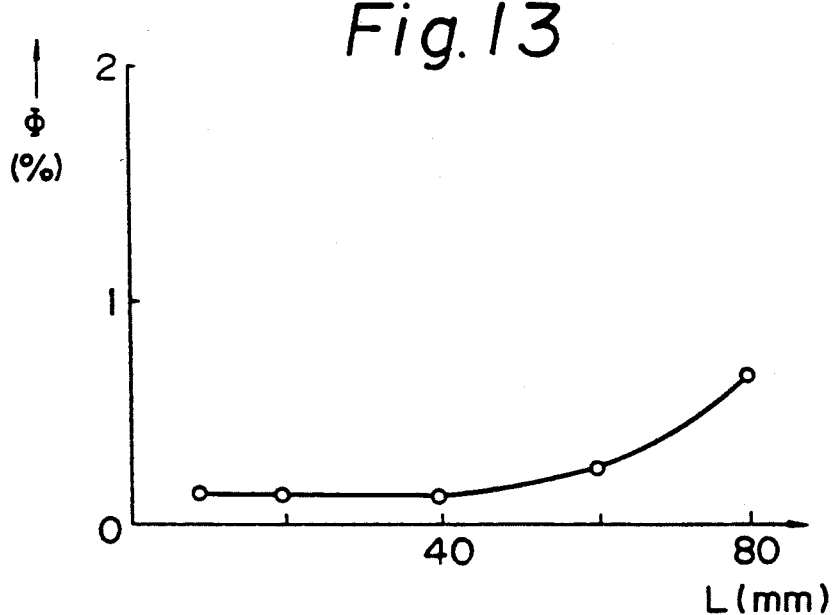
FIG. 13 is a view showing the relationship of the oil circulating rate $\Phi$ and the distance L.

The function of the oil separator 11 of the above-described embodiments is empirically considered. FIG. 13 shows the relationship of the distance L between the inner opening 151 of the medium outlet passage 15 and the separating plate 16 and the oil circulating rate $\Phi$ (%). This oil circulating rate $\Phi$ is obtained from the relationship, $G1/(G1+G2) \times 100$, where G1 is the amount of lubricating oil circulating through the refrigerating system, and G2 is the amount of refrigerating medium.

Figure 14:
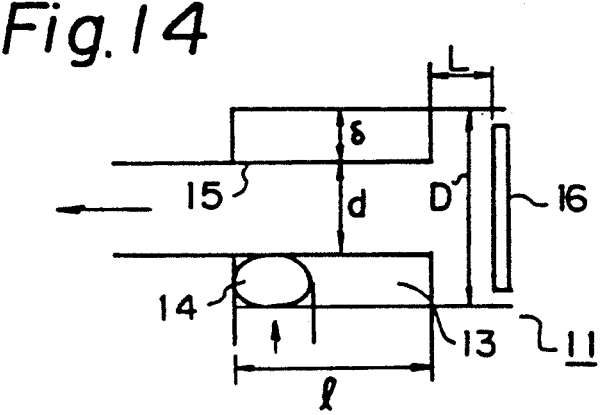
FIG. 14 is a schematic view showing the geometrical arrangement of the sample oil separator used in the test of FIG. 13.

FIG. 14 shows a geometrical arrangement of the oil separator 11 used for obtaining the data of FIG. 13, wherein "D" shows the internal diameter of the oil separating chamber 13, "d" the internal diameter of the medium outlet passage 15, "$\delta$" the distance between the outer surface of the medium outlet passage 15 and the inner surface of the oil separating chamber 13, and "l" the internally extending length of the medium outlet passage 15. The following dimensions are typically: D = 20 mm, d = 12 mm, $\delta$ = 4 mm, and l = 20 mm. To obtain the data of FIG. 13, the compressor is rotated at 1000 rpm and the high and low pressures up on compression are 15 and 2 ($kg/cm^2$).

In the oil separator 11, preferably the distance L between the inner opening 151 of the medium outlet passage 15 and the separating plate 16 is from 5 to 50 mm, to obtain a good separation of the lubricating oil as explained with reference to FIGS. 5 and 6. This distance enables the swirl of lubricating oil around the medium outlet passage 15 to be maintained at a position near to the separating plate 16, and thus the lubricating oil can be easily extruded from the oil separating chamber 13 to the oil storage chamber 18.

As explained above, a plurality of the oil outlet passages 171, 172, and so on are provided at a peripheral region of the separating plate 16 in the embodiment of FIG. 2, and one upper oil outlet passage 17 is provided in the embodiment of FIG. 7. Considering that the oil outlet passage (s) provided in the separating plate (wall) 16 separating the oil separating chamber 13 and the oil storage chamber 18, the size of the oil outlet passage (s) 17, 171, 172, and so on is preferably 2 to 3 mm, and the number and positioning thereof will be optionally determined in accordance with a design requirement.

Figure 15:
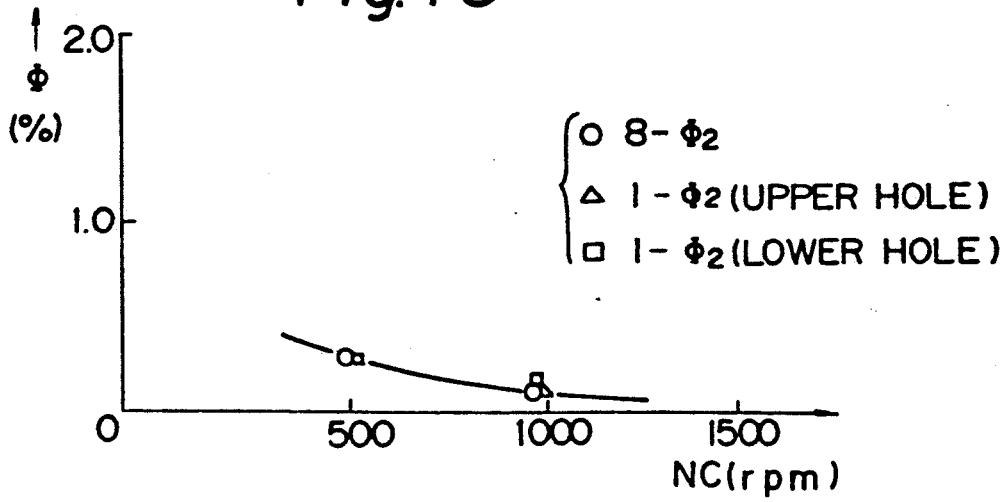
FIG. 15 is a view showing the relationship of the oil circulating rate $\Phi$ and the revolution of the compressor.

FIG. 15 shows the relationship of the oil circulating rate $\Phi$ of the refrigerating system and the revolution Nc of the compressor, in relation to the number and position of the oil outlet passage (s), wherein a circular mark plot shows an example having eight holes with diameter of 2 mm at the peripheral region of the separating plate (wall) 16; a triangular mark plot shows an example having one hole at an upper position; and a square mark plot shows an example having one hole at a lower position.

As apparent from this figure, the oil circulating rate $\Phi$ does not vary much even if the number and position of the oil outlet passage (s) are varied. Therefore, it is possible to determine the oil outlet passage (s) in the separating plate (wall) 16 optionally in correspondence with the disposition of the oil separating chamber 13 and the oil storage chamber 18.

FIG. 16 shows a graph of the oil circulating rate $\Phi$ versus a value (A1/A2), where A1 is the opening area of the inlet passage 14 and A2 is the opening area of the medium outlet passage 15. It will be understood from this figure that it is possible to reduce the oil circulating rate $\Phi$ by reducing the opening area A1 of the inlet passage 14. Where the oil separator is incorporated in the compressor, as shown in the previous embodiments, lubricating oil is contained as fine particulates in the mixed fluid discharged from the compressor, and it is necessary to generate a strong swirl to separate the lubricating oil component from the refrigerating medium. To obtain such a strong swirl, it can be assumed from the characteristic result of FIG. 16 that it is preferable to reduce the diameter of the inlet passage 14.

As described with reference to the various embodiments, the oil separator of the present invention is formed integrally with the compressor, so that the resultant structure is compact and can be equipped in a relatively restricted space, such as an engine room of an automobile. It is further possible to arrange the oil separating chamber and the oil storage chamber in a horizontal side by side relationship, since lubricating oil can be introduced from the oil separating chamber into the oil storage chamber based on a pressure differential therebetween, so that the total structure can be minimized for adapting it to an air conditioner of an automobile having an improved effect. Also, the function of the air conditioner of an automobile will be improved, since the oil separating performance is greatly improved.

We claim:

1. An oil separator used in a refrigerating system comprising an arrangement in series of a compressor, a condenser, an expanding means, and an evaporator, said compressor outputting a mixed fluid of a refrigerating medium and lubricating oil, said oil separator receiving said mixed fluid, separating said lubricating oil from said mixed fluid, and returning said lubricating oil to said compressor, said oil separator comprising:

first circumferential wall means for forming a cylindrical bore therein, to thereby form an oil separating chamber, said oil separating chamber having an axis;

first and second axially spaced end walls closing said cylindrical bore;

means for forming an inlet passage in said first circumferential wall means so that said inlet passage is tangentially connected to said cylindrical bore at a position near said first end wall;

means for forming a medium outlet passage therein to extend coaxially with said axis from said first end wall into said cylindrical bore, said medium outlet passage having an inner opening facing said second end wall;

means for forming at least one oil outlet passage at said second end wall at a position near a periphery of said second end wall; and second circumferential wall means for forming an oil storage chamber therein for storing oil separated in said oil separating chamber and fed through said oil outlet passage;

wherein said compressor comprises a compressor housing, and said first circumferential wall means and said second circumferential wall means are formed integrally with said compressor housing, said compressor housing having an intake passage and a discharge passage, said discharge passage having a discharge end opening, said inlet passage in said first circumferential wall means having an inlet end opening, said first circumferential wall means being integrally mounted on said compressor housing so that said discharge end opening of said discharge passage meets said inlet end opening of said inlet passage, an axis of said oil separator being one of parallel and inclined to an axis of said compressor when said oil separator is affixed to said compressor.

2. An oil separator according to claim 1, wherein said oil separating chamber is formed on one side of said second end wall and said oil storage chamber is formed directly on the other side of said second end wall.

3. An oil separator according to claim 1, wherein said second circumferential wall means includes an inlet portion of an intake passage connected to said intake passage of said compressor housing and said oil storage chamber is connected to said inlet portion of said intake passage via a narrow oil returning passage.

4. An oil separator according to claim 1, wherein said compressor housing has an axis, said first circumferential wall means being integrally mounted on said compressor housing so that said axis of said oil separating chamber is in parallel to said axis of said compressor housing.

5. An oil separator according to claim 1, wherein said compressor housing has an axis and includes a rear housing perpendicular to said axis of said compressor housing, said first circumferential wall means being integrally mounted on said rear housing so that said axis of said oil separating chamber is perpendicular to said axis of said compressor housing.

6. An oil separator according to claim 1, wherein a distance between said inlet passage for introducing said mixed fluid into said cylindrical bore and said inner opening of said medium outlet passage, and a distance between said inner opening of said medium outlet passage and said second end wall, are arranged such that said mixed fluid flowing from said inlet passage into said oil separating chamber swirls along an inner surface of said first circumferential wall means constituting said cylindrical bore and such swirl of said mixed fluid is sufficiently maintained to cause said lubricating oil in said mixed fluid to be centrifugally urged against said inner surface of said first circumferential wall means at a position near said second end wall.

7. An oil separator according to claim 1, wherein said axis of said oil separating chamber is inclined relative to the vertical, and wherein a distance between said inlet passage for introducing said mixed fluid into said cylindrical bore and said inner opening of said medium outlet passage, and a distance between said inner opening of said medium outlet passage and said second end wall, are arranged such that said mixed fluid flowing from said inlet passage into said oil separating chamber swirls along an inner surface of said first circumferential wall means constituting said cylindrical bore and such swirl of said mixed fluid is sufficiently maintained to cause said lubricating oil in said mixed fluid to be centrifugally urged against said inner surface of said first circumferential wall means at a position near said second end wall, against the force of gravity.

8. An oil separator according to claim 1, wherein said cylindrical bore of said oil separating chamber has an internal diameter of about 20 millimeters, said medium outlet passage having an internal diameter of about 12 millimeters, and an inner extending distance of about 20 millimeters between said first end wall and said inner opening of said medium outlet passage, a distance between said inner opening of said medium outlet passage and said second end wall being from about 5 millimeters to 50 millimeters.

9. An oil separator used in a refrigerating system comprising an arrangement in series of a compressor, a condenser, an expanding means, and an evaporator, said compressor outputting a mixed fluid of a refrigerating medium and a lubricating oil, said oil separator receiving said mixed fluid and separating said lubricating oil from said mixed fluid and returning said lubricating oil to said compressor, said oil separator comprising:

first circumferential wall means for forming a cylindrical bore therein, to thereby form an oil separating chamber, said oil separating chamber having an axis;

first and second axially spaced end walls closing said cylindrical bore;

means for forming an inlet passage in said first circumferential wall means so that said inlet passage is tangentially connected to said cylindrical bore at a position near said first end wall;

means for forming a medium outlet passage therein to extend coaxially with said axis from said first end wall into said cylindrical bore, said medium outlet passage having an inner opening facing said second end wall;

means for forming at least one oil outlet passage at said second end wall at a position near a periphery of said second end wall;

second circumferential wall means for forming an oil storage chamber therein for storing oil separated in said oil separating chamber and fed through said oil outlet passage; and a ring member fitted in an inner surface of said second circumferential wall means for constituting said oil storage chamber, means being provided for forming an oil returning passage between said ring member and said second circumferential wall means, said oil returning passage having one end in communication with said oil storage chamber and the other end connectable to a lower pressure portion of said compressor;

wherein said compressor comprises a compressor housing, and said first circumferential wall means and said second circumferential wall means are formed integrally with said compressor housing.

10. An oil separator according to claim 9, wherein said oil separating chamber is formed on one side of said second end wall and said oil storage chamber is formed directly on the other side of said second end wall.

11. An oil separator according to claim 9, wherein said compressor housing has an intake passage and a discharge passage, said discharge passage having a discharge end opening, said inlet passage in said first circumferential wall means having an inlet end opening, said first circumferential wall means being integrally mounted on said compressor housing so that said discharge end opening of said discharge passage meets said inlet end opening of said inlet passage.

12. An oil separator according to claim 11, wherein said second circumferential wall means includes an inlet portion of an intake passage connected to said intake passage of said compressor housing and said oil returning passage is connected to said inlet portion of said intake passage.

13. An oil separator according to claim 9, wherein said compressor housing has an axis, said first circumferential wall means being integrally mounted on said compressor housing so that said axis of said oil separating chamber is in parallel to said axis of said compressor housing.

14. An oil separator according to claim 9, wherein said compressor housing has an axis and includes a rear housing perpendicular to said axis of said compressor housing, said first circumferential wall means being integrally mounted on said rear housing so that said axis of said oil separating chamber is perpendicular to said axis of said compressor housing.

15. An oil separator according to claim 9, wherein a distance between said inlet passage for introducing said mixed fluid into said cylindrical bore and said inner opening of said medium outlet passage, and a distance between said inner opening of said medium outlet passage and said second end wall, are arranged such that said mixed fluid flowing from said inlet passage into said cil separating chamber swirls along an inner surface of said first circumferential wall means constituting said cylindrical bore and such a swirl of said mixed fluid is sufficiently maintained to cause said lubricating oil in said mixed fluid to be centrifugally urged against said inner surface of said first circumferential wall means at a position near said second end wall.

16. An oil separator according to claim 9, wherein said axis of said oil separating chamber is inclined relative to the vertical, and wherein a distance between said inlet passage for introducing said mixed fluid into said cylindrical bore and said inner opening of said medium outlet passage, and a distance between said inner opening of said medium outlet passage and said second end wall are arranged such that said mixed fluid flowing from said inlet passage into said oil separating chamber swirls along an inner surface of said first circumferential wall means constituting said cylindrical bore and such swirl of said mixed fluid is sufficiently maintained to cause said lubricating oil in said mixed fluid to be centrifugally urged against said inner surface of said first circumferential wall means at a position near said second end wall against the gravity.

17. An oil separator according to claim 9, wherein said cylindrical bore of said oil separating chamber has an internal diameter of about 20 millimeters, said medium outlet passage having an internal diameter of about 12 millimeters and an inner extending distance of about 20 millimeters between said first end wall and said inner opening of said medium outlet passage, a distance between said inner opening of said medium outlet passage and said second end wall being from about 5 millimeters to 50 millimeters.

18. An oil separator according to claim 10, wherein said ring member comprises a groove on an outer surface thereof for forming an oil returning passage, said groove having a first lower end connectable to said oil storage chamber and a second upper end, said second circumferential wall means having a hole having a first end connectable to said second upper end of said groove and a second end connectable to a lower pressure portion of said compressor.

19. An oil separator according to claim 18, wherein said groove is helically shaped.

20. An oil separator used in a refrigerating system comprising an arrangement in series of a compressor, a condenser, an expanding means, and an evaporator, said compressor outputting a mixed fluid of refrigerating medium and a lubricating oil, said oil separator receiving said mixed fluid and separating said lubricating oil to said mixed fluid and ruturning and lubricating oil to said compressor, said oil separator comprising:

first circumferential wall means for forming a cylindrical bore therein, to thereby form an oil separating chamber, said oil separating chamber having an axis;

first and second axially spaced end walls closing said cylindrical bore;

means for forming an inlet passage in said first circumferential wall means so that said inlet passage is connected tangentially to said cylindrical bore at a position near said first end wall;

means for forming a medium outlet passage therein to extend coaxially with said axis from said first end wall into said cylindrical bore, said medium outlet passage having an inner opening facing said second end wall;

means for forming at least one oil outlet passage at said second end wall at a position near a periphery of said second end wall;

second circumferential wall means for forming an oil storage chamber therein for storing oil separated in said oil separating chamber and fed through said oil outlet passage, said oil storage chamber being formed directly on the other side of said second wall; and means for forming an oil returning passage for returning lubricating oil from said oil storage chamber to an intake side of said compressor;

wherein said oil outlet passage is provided in said second end wall at a position lower than a highest level of said oil storage chamber so that lubricating oil is introduced from said oil separating chamber into said oil storage chamber under a pressure differential between said oil separating chamber and said oil storage chamber, and said compressor comprises a compressor housing, said first circumferential wall means and said second circumferential wall means being integrally formed with said compressor housing, said compressor housing having an intake passage and a discharge passage, said discharge passage having a discharge end opening, said inlet passage in said first circumferential wall means having an inlet end opening, said first circumferential wall means being integrally mounted on said compressor housing so that said discharge end opening of said discharge passage meets said inlet end opening of said inlet passage, an axis of said oil separator being one of parallel and inclined to an axis of said compressor when said oil separator is affixed to said compressor.

21. An oil separator according to claim 20, wherein said second circumferential wall means includes an inlet portion of an intake passage connected to said intake passage of said compressor housing and said oil storage chamber is connected to said inlet portion of said intake passage via a narrow oil returning passage.

22. An oil separator according to claim 20, wherein said compressor housing has an axis, said first circumferential wall means being integrally mounted on said compressor housing so that said axis of said oil separating chamber is in parallel to said axis of said compressor housing.

23. An oil separator according to claim 20, wherein said compressor housing has an axis and includes a rear housing perpendicular to said axis of said compressor housing, said first circumferential wall means being integrally mounted on said rear housing so that said axis of said oil separating chamber is perpendicular to said axis of said compressor housing.

24. An oil separator according to claim 20, wherein a distance between said inlet passage for introducing said mixed fluid into said cylindrical bore and said inner opening of said medium outlet passage, and a distance between said inner opening of said medium outlet passage and said second end wall, are arranged such that said mixed fluid flowing from said inlet passage into said oil separating chamber swirls along an inner surface of said first circumferential wall means constituting said cylindrical bore and such revolution of said mixed fluid is sufficiently maintained to cause said lubricating oil in said mixed fluid to be centrifugally urged against said inner surface of said first circumferential wall means at a position near said second end wall.

25. An oil separator according to claim 20, wherein said axis of said oil separating chamber is inclined relative to the vertical, and wherein a distance between said inlet passage for introducing said mixed fluid into said cylindrical bore and said inner opening of said medium outlet passage, and a distance between said inner opening of said medium outlet passage and said second end wall are arranged such that said mixed fluid flowing from said inlet passage into said oil separating chamber swirls along an inner surface of said first circumferential wall means constituting said cylindrical bore and such swirl of said mixed fluid is sufficiently maintained to cause said lubricating oil in said mixed fluid to be centrifugally urged against said inner surface of said first circumferential wall means at a position near said second end wall against the force of gravity.

26. An oil separator according to claim 20, wherein said cylindrical bore of said oil separating chamber has an internal diameter of about 20 millimeters, said medium outlet passage having an internal diameter of about 12 millimeters and an inner extending distance of about 20 millimeters between said first end wall and said inner opening of said medium outlet passage, a distance between said inner opening of said medium outlet passage and said second end wall being from about 5 millimeters to 50 millimeters.

27. An oil separator according to claim 20, wherein said oil outlet passage is provided in said second end wall at an upper peripheral position thereof, and said oil storage chamber has an upper surface for delimiting said highest level, said upper surface being at level identical to the highest margin of said oil outlet passage.

28. An oil separator according to claim 1, wherein said compressor housing includes a flange member on a top surface thereof and said oil separator includes a flange member on a bottom surface thereof, said flange members utilized for affixing said compressor housing to said oil separator, said flange members including said inlet passage.

29. An oil separator according to claim 20, wherein said compressor housing includes a flange member on a top surface thereof and said oil separator includes a flange member on a bottom surface thereof, said flange members utilized for affixing said compressor housing to said oil separator, said flange members including said inlet passage.

* * * * *